Figure 1:
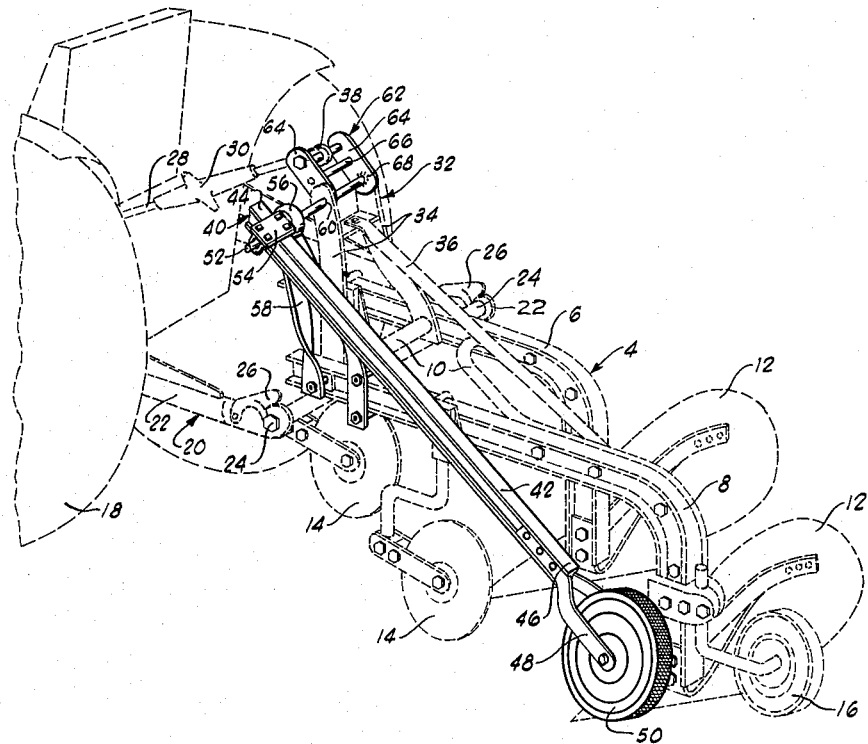

July 4, 1961

C. L. TANSEL 2,990,891

PLOW DEPTH ADJUSTING DEVICE

Filed Dec. 22, 1958

2 Sheets-Sheet 1

INVENTOR.
CECIL L. TANSEL

BY

ATTORNEY

July 4, 1961

C. L. TANSEL 2,990,891

PLOW DEPTH ADJUSTING DEVICE

Filed Dec. 22, 1958

2 Sheets-Sheet 2

INVENTOR.
Cecil L. Tansel

BY

ATTORNEY

United States Patent Office 2,990,891
Patented July 4, 1961

2,990,891
PLOW DEPTH ADJUSTING DEVICE
Cecil L. Tansel, 209 E. Atkinson Drive,
Midwest City, Okla.
Filed Dec. 22, 1958, Ser. No. 782,012
2 Claims. (Cl. 172—239)

This invention relates generally to improvements in agricultural implements, and more particularly, but not by way of limitation, to an improved device for automatically adjusting the operating depth of a plow being pulled by a tractor.

As it is well known in the art, the plow bottoms or shares of at least most of the present day plows which are adapted to be pulled by tractors extend downwardly and forwardly with respect to the beams of the plow. As a result, the plow bottoms frequently tend to dig progressively deeper into the ground as the plow is pulled forwardly by a tractor, and many types of apparatus have been devised to minimize variation in the operating depth of the plow bottoms. For example, many plow constructions utilize a ground engaging wheel secured to the rear end portion of the plow in an attempt to limit the depth at which the plow bottoms may be moved into the ground. With such a ground engaging rear wheel, the action actually obtained is frequently the reverse of the desired action. When such a rear ground engaging wheel tends to be raised with respect to the pulling tractor, indicating that the plow is running too deep, the plow bottoms are pointed in a more downward direction (i.e., the angle of attack of the plow bottoms is increased) which induces the plow bottoms to dig deeper into the ground; whereas the angle of attack of the plow bottoms should be decreased and the plow bottoms urged to move at a smaller depth. A rear ground engaging wheel performs no function when the plow is running too shallow.

Another popular leveling apparatus involves the use of a jack structure connected between the tractor and some portion of the frame of the plow to tilt the plow fore and aft when it is desired to vary the operating depth of the plow. Such a jack construction will effectively control the operating depth of the plow, but the jack must be frequently adjusted by the operator of the tractor during a plowing operation, and if the operator does not constantly observe the operating depth of the plow, the desired results are not obtained. Also, in many types of soil, the operating depth of the plow must be almost constantly varied, which constantly keeps the operator busy operating the jack construction.

The present invention contemplates a novel device for automatically adjusting the operating depth of a plow being pulled by a tractor by automatically tilting the frame of the plow fore and aft when the plow bottoms tend to dig deeper into the ground or tend to rise to a shallower depth than desired. Stated broadly, the present invention may be defined as means pivotally connected to the forward portion of a plow and engaging the ground adjacent the rear portion of the plow for vertical pivotal movement when the operating depth of the plow varies, and means connecting the first-mentioned means to the tractor for tilting the plow fore and aft upon pivotal movement of the first-mentioned means. In a preferred embodiment of this invention, an actuating arm extends along one side of a plow and is pivotally connected to the forward end portion of the plow. The rear end of the actuating arm is provided with a ground engaging wheel positioned adjacent the rear end portion of the plow to pivot the actuating arm vertically when the operating depth of the plow varies. The actuating arm is in turn connected to the hitch of the tractor in such a manner that pivoting movement of the actuating arm induces a tilting of the frame of the plow in the desired direction to counter-act the tendency of the plow to move at a depth other than the desired operating depth. In other words, the present invention contemplates controlling the connection of the plow to the pulling tractor by variations in vertical movement of the rear portion of the plow with respect to the adjacent ground for automatically tilting the plow and controlling the angle at which the plow bottoms are moved through the earth and hence control the operating depth of the plow.

An important object of this invention is to minimize the work required by the operator of a tractor in a plowing operation.

Another object of this invention is to move a plow with only minor variations in the operating depth of the plow.

A further object of this invention is to automatically control the operating depth of a plow without requiring the attention of the operator of a tractor or the like being used to pull the plow.

Another object of this invention is to provide a plow depth adjusting device which may be easily installed on existing plows and tractors with a minimum of alteration of the existing plow construction.

A still further object of this invention is to provide a plow depth adjusting device which is simple in construction, may be economically manufactured, and which will have a long service life.

Other objects and advantages of the invention will be evident from the following detailed description, when read in conjunction with the accompanying drawings which illustrate my invention.

In the drawings:
FIGURE 1 is a perspective view of one form of device constructed in accordance with this invention shown in operating position with respect to a tractor and a plow, and with the tractor and plow being shown in dashed lines to distinguish the existing structure from the new structure.

Figure 2:
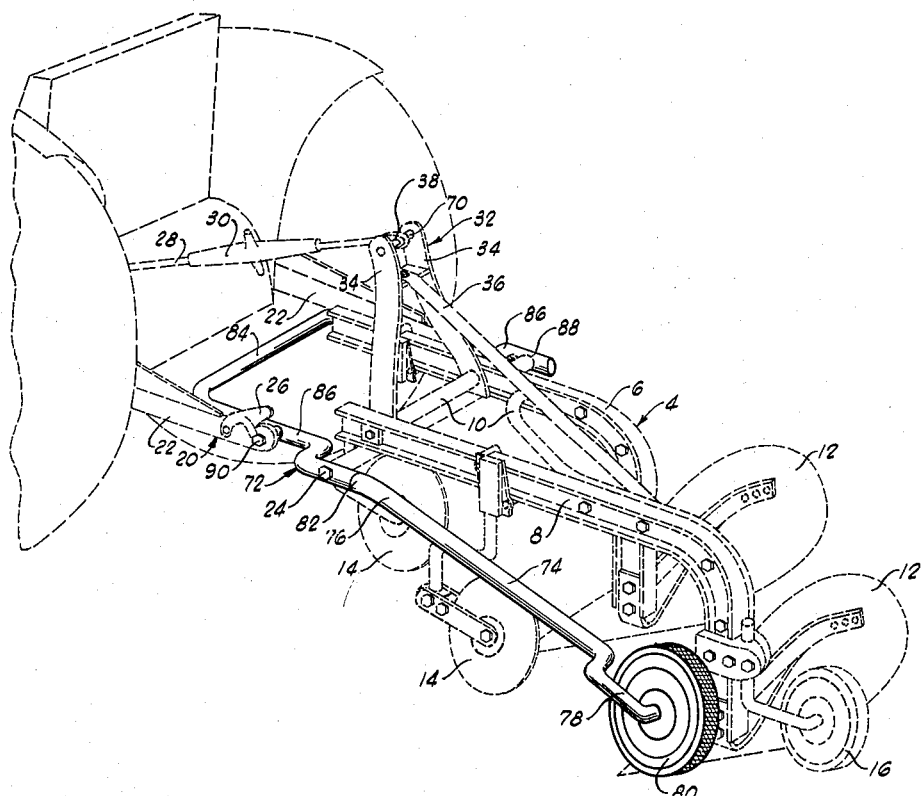

FIGURE 2 is a view similar to FIG. 1 illustrating another form of device constructed in accordance with this invention.

Referring to the drawings in detail, and particularly FIG. 1, reference character 4 generally designates a two-bottomed plow having a right hand plow beam 6 and a left hand beam 8 interconnected by suitable braces 10. The rear end portion of each of the plow beams 6 and 8 is bent downwardly and has a plow bottom or share 12 secured thereon in a conventional manner. Each of the plow shares 12 is pointed downwardly and forwardly with respect to the horizontal portions of the plow beams 6 and 8 in the usual fashion, and each share 12 is extended and shaped in such a manner as to move dirt to the right hand side of the respective plow share, such that the ground to the left of the plow beam 8 will be undisturbed. Also, a plow disc 14 is normally secured by suitable supporting structure on each of the plow beams 6 and 8 forwardly of the respective plow shares 12. A ground engaging wheel 16 may be secured on the rear end of the rear-most plow beam 8 if desired, and, in fact, such a ground engaging wheel is sometimes provided by the manufacturer of the plow 4.

The plow 4 is constructed in such a manner as to be pulled and operated by a suitable tractor 18 having a three point hitch generally designed by reference character 20. The hitch 20 comprises two horizontal arms 22 normally extending rearwardly from the tractor 18 and pivotally secured (not shown) at their forward ends to the rear axial housing of the tractor 18. Also, a power lift (not shown) is normally provided on the tractor 18 for simultaneously raising and lowering the arms 22 of the hitch 20 for raising and lowering the plow 4. The rear ends of the horizontal arms 22 of the hitch 20 are connected to the opposite ends of a transversely extending bar 24 secured across the plow beams 6 and 8, such that the tractor 18 will pull the plow 4 in a forward direction. A suitable latch 26 is normally provided on the rear end of each arm 22 to facilitate the connection of the plow 4 to the arms 22 and to lock the bar 24 to the arms 22. However, the bar 24 may be turned in the latches 26.

The hitch 20 also includes an upper adjusting arm 28 having a turnbuckle 30 interposed therein and being pivotally secured (not shown) to the frame structure of the tractor 18 for pivotal movement in a vertical plane. The adjusting arm 28 is normally positioned about halfway between the arms 22 and is anchored at a point above the arms 22 to additionally secure the plow 4 to the tractor 18. The adjusting arm 28 is normally secured to the upper end of a frame structure (generally designated by reference character 32) extending upwardly from the forward portion of the plow 4. The frame 32 comprises two side braces 34 which may be suitably secured to the forward portions of the plow beams 6 and 8, and a rearwardly extending brace 36 to add additional strength to the braces 34 and prevent forward or rearward bending of the frame 32 with respect to the plow beams 6 and 8. An eye 38 on the rear end of the adjusting arm 28 of the hitch 20 is normally pivotally secured to the upper end of the frame 32, such that the plow 4 will be raised when the arms 22 of the hitch 20 are raised by the power lift of the tractor 18. Also, the turnbuckle 30 is normally adjusted by the operator of the tractor 18 for initially setting the operating depth of the plow 4. It will be apparent that when the adjusting arm 28 is connected directly to the upper end portion of the frame 32, adjustment of the turnbuckle 30 will tilt the plow 4 fore and aft about the axis of the bar 24 and control the angle of attack of the plow shares 12 to in turn control the operating depth of the plow. During a normal operation of the plow, the tractor power lift is used to make minor adjustments in the operating depth of the plow by raising and lowering the forward end of the plow.

The structure thus far described in detail is conventional and exemplifies a typical plow assembly and operation. In accordance with the present invention, I provide a novel device, generally designated by reference character 40, for automatically adjusting the operating depth of the plow 4, rather than by use of the power lift of the tractor.

The device 40 comprises an arm 42 extending along the left hand side of the plow 4 at a vertical angle with respect to the beams 6 and 8. The arm 42 may be of any desired construction, such as an I-beam, and is of a length substantially equal to the length of the plow 4, such that when the forward end 44 of the arm is positioned opposite the forward end portion of the plow 4, the rear end 46 of the arm will be positioned opposite the rear end portion of the plow 4. It will be understood that the arm 42 extends substantially parallel with the plow beams 6 and 8 when viewed in plan. A suitable yoke 48 is secured to the rear end 46 of the arm 42 to rotatably support a ground engaging wheel 50 adjacent the rear end portion of the plow 4. Any desired wheel construction may be used, although I prefer to use a rubber-tired wheel to provide a smooth operating device and to minimize shocks imposed on the arm 42. It will also be observed that the wheel 50 engages the ground to the left of the plow 4, such that the wheel 50 will be moved over uninterrupted ground which has not been disturbed by the plow shares 12 to provide a true indication of the operating depth of the plow 4 by the relative positions of the plow beams 6 and 8 and the wheel 50.

The forward end 44 of the arm 42 is rigidly secured to a horizontally extending shaft 52 by use of a suitable clamp 54 to provide a turning of the shaft 52 upon vertical movement of the wheel 50, as will be more fully hereinafter set forth. The shaft 52 extends transversely with respect to the plow 4 and the tractor 18 and is journaled in a suitable bearing 56 supported on the plow 4 by arms 58 extending upwardly from the left hand plow beam 8. The shaft 52 is also journaled in complementary apertures 60 formed in both side braces 34 of the frame 32. Thus, the shaft 52 is held fixed with respect to the plow 4 and will be turned when the wheel 50 is moved vertically with respect to the plow.

A bracket 62 provides a connection between the shaft 52 and the eye 38 of the adjusting arm 28. The bracket 62 comprises two links 64 interconnected by transversely extending bolts 66. The lower end of each link 64 is apertured to receive the shaft 52 and the shaft 52 is in turn rigidly secured to each link 64 by welding 68 to provide a turning of the bracket 62 upon turning of the shaft 52. The upper bolt 66 of the bracket 62 is extended through the eye 38 of the adjusting arm 28, and the bracket 62 is extended upwardly and forwardly from the shaft 52 when the plow 4 is in operating position.

In operation of the device 40, the arm 42 is secured on the shaft 52 at such an angle, and the turnbuckle 30 is adjusted to provide the desired position of the wheel 50 with respect to the plow beams 6 and 8. In other words, the wheel 50 is adjusted at such a vertical position to engage the ground adjacent the plow 4 when the plow shares 12 are extended into the ground the desired depth. As the plow 4 is pulled forwardly by the tractor 18, the plow shares 12 form a double furrow and the wheel 50 engages the uninterrupted ground to the left of the plow 4. In the event the plow shares 12 tend to operate at a greater depth, the rear portions of the plow beams 6 and 8 will move slightly downward with respect to the wheel 50. The arm 42 is therefore pivoted counter-clockwise (when viewed from the left hand side of the plow 4) about the axis of the shaft 52. This movement of the arm 42 is translated to the shaft 52 and then to the bracket 62 to urge the frame 32 of the plow 4 in a clockwise direction around the axis of the bar 24 connected to the horizontal arms 22 of the hitch 20. The plow beams 6 and 8 are therefore tilted in a direction to decrease the angle at which the plow shares 12 enter the ground. As a result, the plow shares 12 will tend to move upwardly and again resume the desired operating depth.

In the event the plow shares 12 tend to move above the desired operating depth, the wheel 50 is moved downwardly with respect to the rear end portions of the plow beams 6 and 8 to turn the shaft 52 in a clockwise direction and urge the frame 32 in a counter-clockwise direction about the axis of the bar 24. This movement in turn tilts the plow 4 in a direction to increase the angle at which the plow shares 12 extend into the ground to in turn increase the operating depth of the plow back to the desired operating depth.

From the foregoing it will be apparent that the device 40 tilts the plow 4 fore and aft in the desired direction to correct the angle of attack of the plow shares 12 and automatically maintain the desired operating depth for the plow 4. It may also be observed that when it is desired to move the plow 4 from one field to another, the arms 22 of the hitch 20 are raised by the power lift of the tractor 18. The upward movement of the forward portion of the plow 4 tends to pivot the adjusting arm 28 in a counter-clockwise direction to pull the frame 32 forwardly and lift the entire plow construction above the level of the ground. When the new plowing location is reached, the power lift of the tractor is simply lowered to lower the arms 22 to substantially horizontal positions.

In FIG. 2 the construction of the plow 4, the tractor 18 and the hitch 20 is the same as illustrated and described in detail in connection with FIG. 1. In this respect the only difference between FIGS. 1 and 2 is that in FIG. 2 the brace 32 extending upwardly from the forward portion of the plow 4 is provided with a bolt 70 which extends through the eye 38 of the hitch adjusting arm 28. This construction, as previously indicated, is conventional in present day plow and tractor constructions.

The modified adjusting device (generally designated by reference character 72) used for adjusting the operating depth of the plow 4 shown in FIG. 2 comprises an elongated arm 74 extending along the left hand side of the plow 4 at a vertical angle with respect to the plow beans 6 and 8. The arm 74 may be of any desired construction, such as in the form of a pipe, and is preferably bent at 76 immediately rearward of the forward portion of the plow beam 8 to extend the rear end 78 of the arm outwardly with respect to the adjacent plow beam 8. The rear end portion 78 of the arm 74 is turned inwardly to rotatably support a ground engaging wheel 80 opposite the rear end of the plow 4 a sufficient distance to the side of the plow beam 8 to engage uninterrupted ground. It will be understood that the plow shares 12 move dirt to the right as the plow 4 is moved forwardly.

The forward end 82 of the arm 76 is rigidly secured to one side of a generally U-shaped bracket 84 to provide a connection of the plow 4 to the horizontal arms 22 of the hitch 20. It will also be understood that the bracket 84 may be merely an extension of the arm 74 if desired. Each leg 86 of the bracket 84 is provided with an aperture 88 therein to receive the opposite end portions of the bar 24 which extends transversely across the plow beams 6 and 8. The bar 24 is journaled in the legs 86 of the backet 84, such that the plow 4 may be tilted fore and aft with resspect to the bracket 84 and the arm 74. The legs 86 of the bracket 84 are off-set inwardly immediately forward of the bar 24 and are provided with outwardly extending projections 90 for reception in the latches 26 on the rear ends of the hitch arms 22. Thus, the bracket 84 is rigidly secured to the arm 74 and is pivotally secured to the plow 4 and the tractor hitch 20 to pivot the forward portion of the plow 4 up and down upon pivoting movement of the arm 74.

In operation of the apparatus illustrated in FIG. 2, it will be apparent that movement of the tractor 18 is transmitted through the arms 22 of the hitch 20 and the bracket 84 to the bar 24 of the plow 4 to move the plow 4 forwardly in a plowing operation. The adjusting arm 28 also pulls forwardly on the frame 32 of the plow 4 to normally retain the plow beams 6 and 8 at the desired angle with respect to the tractor 18 and arrange the operating depth of the plow shares 12. The arm 74 is extended downwardly from the bracket 84 at such an angle that the wheel 80 will engage the ground adjacent the rear left hand side of the plow 4 when the plow shares 12 are operating at the desired depth. In the event the plow shares 12 tend to move downwardly and increase the operating depth of the plow, the wheel 80 reacts on the ground and the bracket 84 reacts on the arms 22 of the hitch 20 to urge the bar 24 and the forward end of the plow upwardly relative to the rear end of the plow. As a result, the plow beams 6 and 8 are tilted upwardly and forwardly. This movement of the plow beams 6 and 8 reduces the angle of attack of the shares 12, such that the plow shares 12 will tend to move upwardly in the ground back to the normal operating depth.

In the event the plow shares 12 shown in FIG. 2 tend to run at a shallower depth than the desired depth, the wheel 80 moves downwardly with respect to the rear end portion of the plow. This movement of the wheel 80 pivots the arm 74 and the bracket 84 clockwise about the projections 90 to lower the forward end portions of the plow beams 6 and 8. It will be apparent that this movement of the plow beams 6 and 8 incerases the angle of attack of the plow shares 12 to again increase the operating depth of the plow to the desired level.

As previously indicated, the turnbuckle 30 of the installation shown in FIG. 2 is adjusted to control the desired operating depth of the plow shares 12, and the device 72 retains this desired operating depth. During operation of the device 72 the turnbuckle 30 remains in its original set condition, and the adjusting arm 28 merely pivots up and down as the angle of attack of the plow shares 12 is varied by upward and downward movement of the forward portion of the plow.

From the foregoing it will be apparent that the present invention provides a uniform plowing operation which requires a minimum of attention by the operator of the tractor which is being used to pull a plow. The operating depth of a tractor driven plow is maintained automatically during a plowing operation and yet the entire plow structure may be lifted in the usual manner for transportation from one plowing location to another. Installation of an adjusting device constructed in accordance with this invention requires a minimum alteration of the existing plow structure, and the installation may be easily made by the owner of a plow. It will also be apparent that a device constructed in accordance with the present invention is simple in construction, may be economically manufactured, and will have a long service life.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:
1. A device for adjusting the operating depth of a plow having a forward end and a rear end and being pulled by a tractor having two rearwardly extending and parallel hitch arms, comprising a U-shaped bracket of a size to extend around the forward end of the plow with the leg portions of the bracket positioned outwardly of the opposite sides of the forward portion of the plow and the bight portion of the bracket extended between the hitch arms, fastening means pivotally securing each leg of the bracket to the adjacent hitch arm and to the forward end of the plow to pull the plow through the medium of the bracket upon forward movement of the tractor, an actuating arm rigidly secured to one leg of the bracket rearwardly of the connection of the respective leg to the plow, said actuating arm being extended rearwardly and downwardly from the forward end of the plow along the side of the plow opposite the direction in which the plow moves dirt, and a ground engaging wheel rotatably secured on the rear end of the actuating arm to pivot the bracket and control the vertical position of the forward end of the plow in accordance with the height of the ground engaging wheel.

2. A device as defined in claim 1 wherein said ground engaging wheel is positioned adjacent the rear of the plow and at one side of the plow.

References Cited in the file of this patent

UNITED STATES PATENTS

| | | |
|---|---|---|
| 1,637,811 | Ferguson | Aug. 2, 1927 |
| 2,704,015 | Wilson | Mar. 15, 1955 |
| 2,755,721 | Rusconi | July 24, 1956 |
| 2,790,366 | McKinzie | Apr. 30, 1957 |

FOREIGN PATENTS

| | | |
|---|---|---|
| 510,632 | Germany | Oct. 21, 1930 |
| 1,016,044 | Germany | Sept. 19, 1957 |
| 138,680 | Sweden | Jan. 7, 1953 |